United States Patent [19]
Reiland

[11] 3,945,227
[45] Mar. 23, 1976

[54] PROTECTIVE BRACKET

[76] Inventor: Peter M. Reiland, 13 Medley Lane, Branford, Conn. 06405

[22] Filed: Dec. 30, 1974

[21] Appl. No.: 537,208

[52] U.S. Cl.................................. 70/58; 70/DIG. 57
[51] Int. Cl.².......................................... E05B 73/00
[58] Field of Search........ 16/148, 172; 248/27, 203; 211/4; 70/57, 58, 229, 230, 232, 258, DIG. 57

[56] References Cited
UNITED STATES PATENTS

| | | | |
|---|---|---|---|
| 686,603 | 11/1901 | Grossett | 16/172 |
| 3,410,122 | 11/1968 | Moses | 70/58 |
| 3,673,828 | 7/1972 | Jones | 70/58 |

*Primary Examiner*—Robert L. Wolfe
*Attorney, Agent, or Firm*—DeLio and Montgomery

[57] ABSTRACT

A bracket comprising fixed and hinged elements adapted to be secured to a support such as the dashboard of an automobile for preventing unauthorized removal of an article, such as a radio, tape deck or the like which is attached to the support, the hinged elements being adapted for locking together in closed position, as by a padlock, in which position detachment of the article from the support is prevented. The elements may be assembled to receive articles of varying sizes and shapes.

3 Claims, 6 Drawing Figures

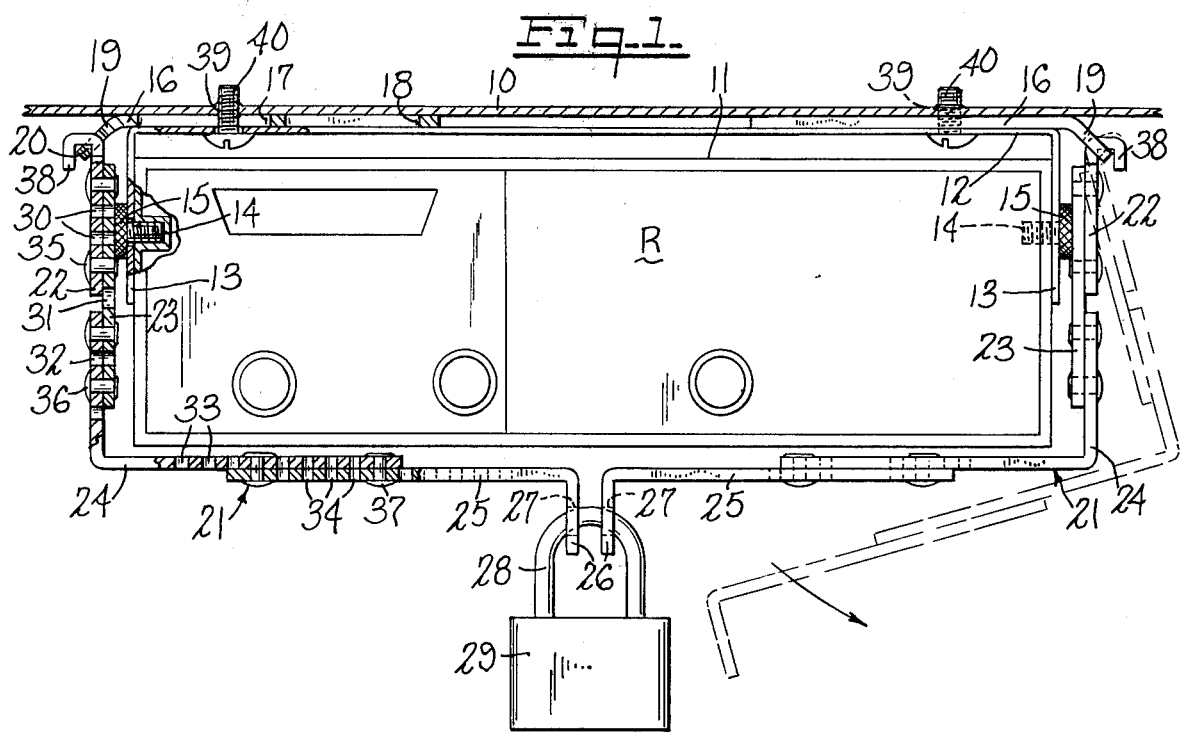
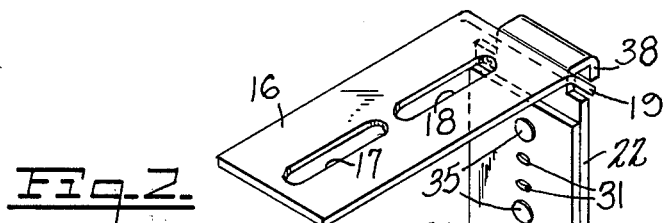
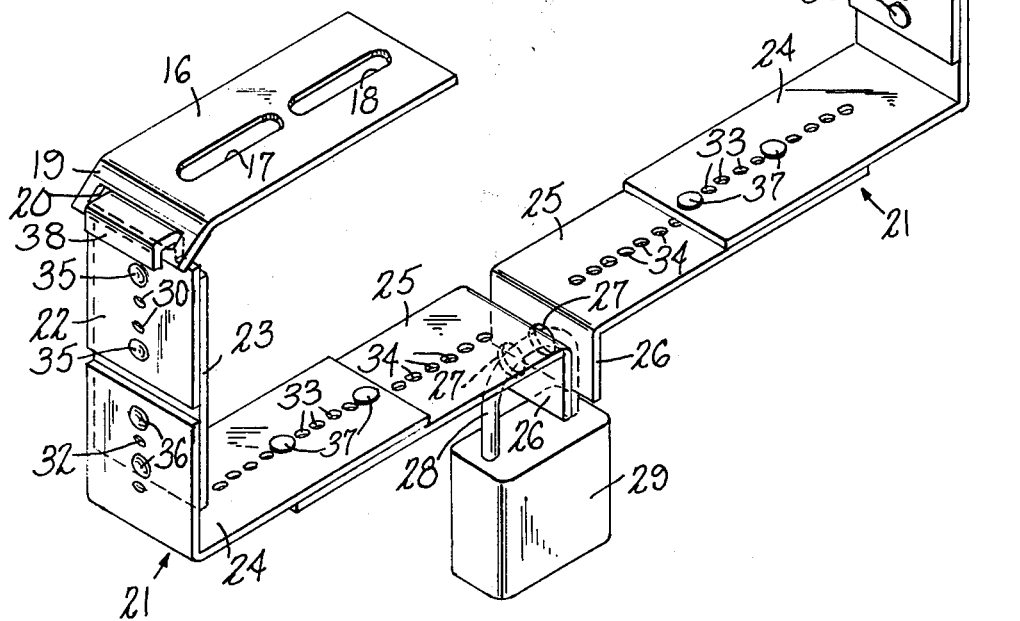

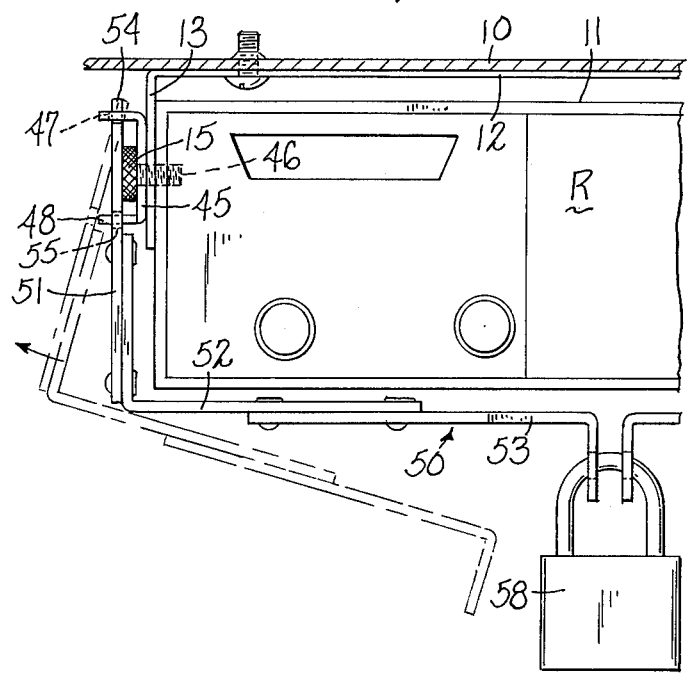
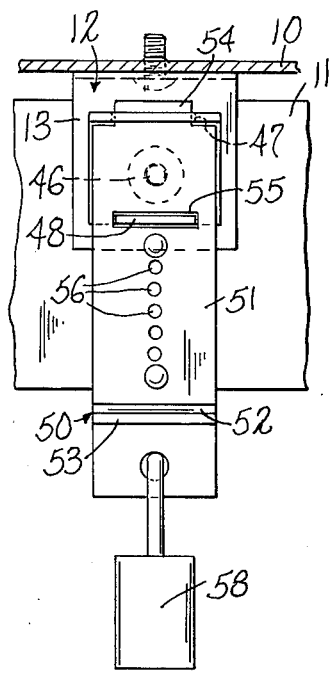
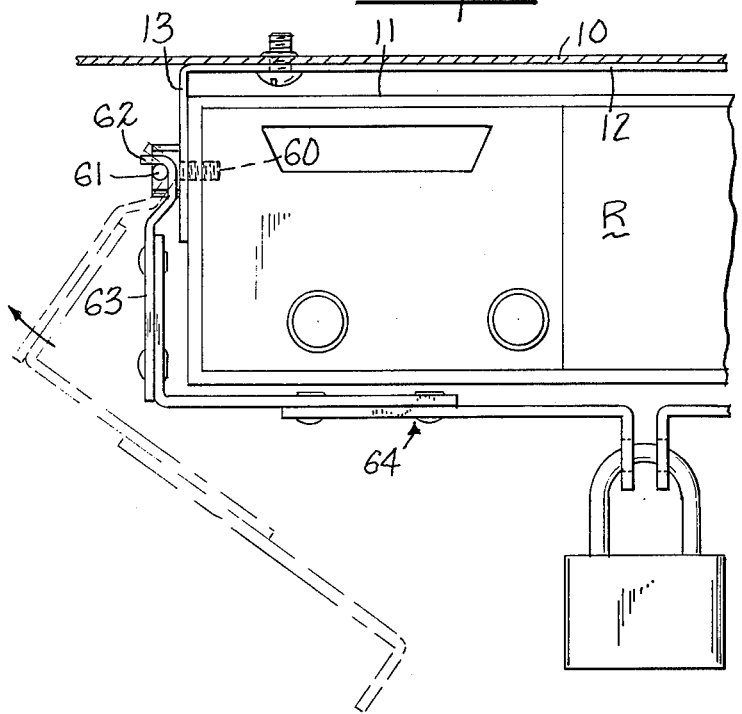
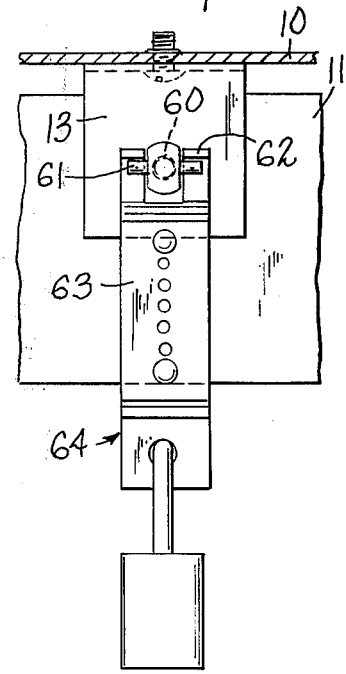

PROTECTIVE BRACKET

This invention relates to a protective bracket and more particularly to a bracket for preventing the removal of an article from a support to which it is mounted.

Certain accessories, such as radio sets and tape decks or other accessories are normally mounted beneath the dashboard of an automobile by means of a hanger which is screwed to the inwardly extending skirt below the insrument panel. Supplementary attachments may also be provided but the securement is frequently such that theft of the article can be effected quite readily by the use of simple tools, and such thefts are a major problem. A similar situation exists in regard to automobile batteries which may merely rest in a support where they are held by easily releasable wing nuts.

The protective bracket according to the invention comprises fixed and hinged elements, the fixed elements being designed for attachment in properly adjusted positions to a metal surface such as the dashboard of an automobile, while the hinged elements are adapted for engagement with ends of the first elements, for folding around an article to be retained and for locking together in closed position, as by a padlock. The arrangement of the parts is such that all the screws attaching the article and/or the bracket to the support are in positions such that they cannot be unscrewed when the bracket is locked in closed position.

It is an object of the present invention to provide a protective bracket which can be screwed into position adjacent a supporting surface and in which the article to be supported is held in a manner to prevent theft, except by the exercise of destructive force.

It is a further object to provide such a bracket, the component parts of which can be adjusted and assembled to hold articles varying substantially in size and shape.

It is another object to provide a mounting bracket which holds securely an article in a case, without damage to or alteration of the case.

It is a still further object to provide certain improvements in the form, construction and arrangement of the several parts by which the above named and other objects may effectively be attained.

The invention accordingly comprises an article of manufacture possessing the features, properties, and the relation of elements which will be exemplified in the article hereinafter described, and the scope of the invention will be indicated in the claims.

Practical embodiments of the invention are shown in the accompanying drawings, wherein:

FIG. 1 represents a front elevation, parts being in vertical section, showing the mounting bracket in use to hold a radio, the open position of one hinged element being shown in broken lines;

FIG. 2 is an isometric projection of the bracket alone, in closed position;

FIG. 3 represents a detail front elevation of a first modified form of the bracket, parts being broken away and the open position being shown in broken lines;

FIG. 4 represents an end elevation of the bracket shown in FIG. 3, viewed from the left of said figure;

FIG. 5 represents a detail front elevation of a second modified form of the bracket, parts being broken away and the open position being shown in broken lines, and FIG. 6 represents an end elevation of the bracket shown in FIG. 5, viewed from the left of said figure.

Referring to the drawings, a support such as the skirt beneath the instrument panel of an automobile is shown in section at 10. The article to be mounted thereon is represented as a radio R having a box-like case 11 and an elongated hanger 12, the downturned ends 13 of which are traversed by the mounting screws 14 which have flat knurled heads 15, the features just described being conventional, and the screws 14 being releasable mounting devices.

The bracket for preventing removal of the radio from its support comprises the upper elements 16 in the form of flat straps, provided with longitudinally extending slots 17, 18, short downwardly bent end portions 19 and transverse horizontally disposed slots 20 in said end portions. The elements 16 are intended to be secured tightly to the support 10, and are referred to herein as "fixed" elements.

Each hinged element 21 is preferably an assembly of pieces including an upper end plate 22, a tie plate 23, an angle plate 24 and a base plate 25, the last named piece having a downwardly bent end 26 with a hole 27 to receive the bow 28 of a padlock 29. The plates 22, 23, 24, 25 are provided with medially disposed rows of uniformly spaced holes 30, 31, 32, 33, 34 enabling the plates to be securely connected together in a wide variety of adjusted positions by means of the rivets 35, 36, 37. The upper end plates 22 terminate upwardly in outwardly turned downwardly facing hooks 38 designed to engage in the slots 20, as shown in FIGS. 1 and 2.

To attach the bracket, described above, to its support the radio R is removed from its hanger 12, the support 10 is drilled or punched at suitable points 39, corresponding to holes in the hanger, to receive the bracket screws 40 (which may be self-threading) and the screws are then passed through the hanger and slots 17 or 18 in a pair of upper elements 16 and screwed into their holes 39. Before tightening the screws the elements 16 are adjusted to positions such that the tie plates 23 will rest firmly against the heads 15 of the mounting screws 14 when the bracket elements are locked in their closed position. Having ascertained the proper adjustment to insure that relationship, the screws 39 are tightened home. (These screws should be of the slotted head type and rounded so that they cannot be turned by a wrench or pliers.) The radio R is then replaced in its hanger where it is held by screws 14, projecting into sockets in the radio case, as shown in FIG. 1, the hinged elements 21 are connected to the fixed upper elements 16 by engaging the respective hooks 38 in the slots 20, the elements 21 are moved to closed position and are locked there by application of the padlock 29.

If the parts have been sized and assembled correctly, the tie plates 23 will bear against the heads 15 of screws 14, so that they cannot be unscrewed, and the heads of screws 40 will be visible (if at all) only through the narrow space remaining between the top of the radio case and the lower surface of the hanger, in which position the screws are not accessible to tampering.

While each hinged element could, if desired, be formed from a single strip, the provision of separate plates 22–25 with perforations 30–34 makes it possible to form, at the point of use, a bracket which has built-in reinforcement and which is "custom made" for the particular radio or other article being installed. This involves merely ascertaining the dimensions of the article, assembling the plates in the relationship required to accommodate an article of that size and shape and peening down the rivets in their respective pairs of holes. The sturdiest construction will result when the rivets of each pair are spaced as far apart as possible (note rivets 35 in the upper and lower holes 30 connecting plates 22 and 23).

In a first alternative form of bracket, shown in FIGS. 3 and 4, the upper fixed bracket elements (16 in FIG. 1) are eliminated and the hanger 12 is screwed directly to its support 10 by means of the screws 40, the holding function of the fixed element 16 being performed by a flat yoke 45, bored for attachment to the hanger and radio by a mounting screw 46 (like 14, but longer, if necessary). The yoke is bent outward at its upper end and provided with a transverse slot 47, while its lower end is narrowed and bent out to form a key 48. The hinged element 50 is constituted by an end plate 51, an angle plate 52 and a base plate 53, the end plate terminating upwardly in a tongue 54, adapted to fit, with minimal play, in the slot 47, and the plate being provided with a transverse slot 55 adapted to receive the key 48. The lower portion of plate 51 has a row of holes 56 to permit riveting, in a suitable adjusted position, to the upturned portion of the angle plate 52, the latter corresponding to plate 24 in FIGS. 1 and 2 and base plate 53 corresponding to plate 25.

The installation of a radio or the like by means of the bracket just described is effected by screwing the hanger to its support, mounting a yoke 45 on each end of the hanger and radio by mounting screws 46, engaging the tongues 54 of each hinged element 50 in the respective slots 47, folding the elements 50 toward each other to bring the keys 48 into the slots 55, and locking the elements 50 together by means of a padlock 58. The slots 47 are so located that the end plates 51 will bear against the heads of mounting screws 46, in the closed position, and the width of the plates 51 is such that the screw heads cannot easily be reached for turning (see FIG. 4); the frictional engagement of the plates with the screw heads can be augmented in various ways, if desired or deemed necessary.

The second alternative form of bracket, shown in FIGS. 5 and 6, differs from the form of FIGS. 3 and 4 in requiring a special head on the mounting screw 60, the flat-sided head having a cross-bar 61, the ends of which can be engaged by the hooks 62 on the clevis-shaped upper end of the end plate 63 (corresponding to plate 51 in FIGS. 3 and 4) when the cross-bar is in fixed horizontal position. The hinged element 64, of which plate 63 is a part, is the same in other respects as the element 50 and is constructed and operated in the same manner. It will be noted that the cross-bar ends 61 function similarly to the slots 20 (FIG. 1) and 47 (FIG. 3) in hingedly engaging the ends of the hinged elements.

Each of the brackets described above, in its locked position, makes it practically impossible to free the radio or other article from its mounting screws, and the evident difficulty of doing so is an effective deterrent to persons considering such an attempt.

In some situations the support is so disposed that an article (radio, etc.) must be mounted on its upper surface, or on the side of a vertical surface; the brackets shown herein can be used in inverted position, or horizontally or vertically with only routine modifications. Specifically, the bracket elements of FIGS. 1 and 2 can readily be adapted to the securement of a battery, the bracket being either inverted or mounted to open laterally.

It will be understood that various other changes may be made in the form, construction and arrangement of the several parts without departing from the spirit and scope of the invention, and it is intended that all matter contained in the above description and shown in the accompanying drawings shall be interpreted as illustrative and not in a limiting sense.

What is claimed is:

1. A bracket for preventing removal of an article from a support on which it is mounted, comprising elements fixed to the support, elongated elements hinged to the fixed elements, releasable mounting devices securing the article to the support, the hinged elements being adapted to take a closed position preventing the release of said mounting devices, an elongated hanger for the supported article, means attaching the hanger to a support, and a lock for holding the hinged elements in closed position, the fixed elements being flat strips held between the hanger and the support, and having ends projecting beyond the ends of the hanger for hinged engagement with ends of the elongated elements, and the mounting devices being screws which connect the article to the hanger.

2. A bracket for preventing removal of an article from a support on which it is mounted, comprising elements fixed to the support, elongated elements hinged to the fixed elements, rereasable mounting devices securing the article to the support, the hinged elements being adapted to take a closed position preventing the release of said mounting devices, an elongated hanger for the supported article, means attaching the hanger to a support, and a lock for holding the hinged elements in closed position, the fixed elements being flat yokes adjacent to the mounting devices and held by the mounting devices on the ends of the hanger, and the mounting devices being screws which connect the article to the hanger.

3. A bracket according to claim 2 wherein each yoke is provided with a slot to receive an end of the hinged element and a key to engage a slot in said hinged element.

* * * * *